(12) United States Patent
Joshi et al.

(10) Patent No.: US 9,244,905 B2
(45) Date of Patent: Jan. 26, 2016

(54) COMMUNICATION CONTEXT BASED PREDICTIVE-TEXT SUGGESTION

(71) Applicant: Microsoft Corporation, Redmond, WA (US)

(72) Inventors: Abhijit Joshi, Redmond, WA (US); David Michael Callaghan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 13/707,433

(22) Filed: Dec. 6, 2012

(65) Prior Publication Data

US 2014/0163954 A1 Jun. 12, 2014

(51) Int. Cl.
*G06F 17/27* (2006.01)
*G06F 17/20* (2006.01)
*G06F 17/21* (2006.01)
*G06F 3/023* (2006.01)

(52) U.S. Cl.
CPC ............ *G06F 17/276* (2013.01); *G06F 3/0237* (2013.01)

(58) Field of Classification Search
CPC .... H04M 1/72527; G06F 3/227; G06F 3/237; G06F 3/481
USPC ............... 704/1, 8, 9, 10; 379/93.19; 345/173
See application file for complete search history.

(56) References Cited

U.S. PATENT DOCUMENTS

| | | | |
|---|---|---|---|
| 7,739,102 B2 * | 6/2010 | Bender | 704/9 |
| 8,903,719 B1 * | 12/2014 | Landry et al. | 704/10 |
| 2005/0240393 A1 * | 10/2005 | Glosson | 704/8 |
| 2006/0247915 A1 * | 11/2006 | Bradford et al. | 704/1 |
| 2007/0076862 A1 * | 4/2007 | Chatterjee et al. | 379/433.06 |
| 2008/0195388 A1 | 8/2008 | Bower et al. | |
| 2008/0243736 A1 | 10/2008 | Rieman et al. | |
| 2008/0294982 A1 | 11/2008 | Leung et al. | |
| 2009/0106695 A1 * | 4/2009 | Perry et al. | 715/816 |
| 2011/0060984 A1 | 3/2011 | Lee | |
| 2011/0320548 A1 * | 12/2011 | Jonsson | 709/206 |
| 2012/0089925 A1 | 4/2012 | Perry et al. | |
| 2012/0101811 A1 | 4/2012 | Griffin et al. | |
| 2012/0173222 A1 | 7/2012 | Wang et al. | |
| 2012/0185239 A1 | 7/2012 | Goud et al. | |

OTHER PUBLICATIONS

International Search Report and Written Opinion for PCT/US2013/073730 dated Feb. 25, 2014, 8 pages.

(Continued)

*Primary Examiner* — Jesse Pullias
(74) *Attorney, Agent, or Firm* — Sunah Lee; Judy Yee; Micky Minhas

(57) ABSTRACT

Disclosed herein are representative embodiments of tools and techniques for determining predicted-text suggestions based on communication contexts. According to one exemplary technique, text that recurs in one or more past communications is determined. The one or more past communications being associated with at least one context attribute. Also, a text entry is stored in a text suggestion dictionary. The text entry comprising the text and metadata associating the text with the at least one context attribute. Additionally, using the text suggestion dictionary, at least one predicted-text suggestion that includes the text is determined for a current communication associated with a communication context.

18 Claims, 12 Drawing Sheets

(56) References Cited

OTHER PUBLICATIONS

Fitchard, Kevin, "Swype's New "Living Keyboard" Doesn't Just Predict: It Learns," 11 pages, Published on: Jun. 20, 2012, Available at: http://gigaom.com/mobile/nuance-swype-living-keyboard-predicts-learns/.

"Typing Assistant", Published on: Jul. 16, 2011, 2 pages, Available at: http://www.sumitsoft.com/.

* cited by examiner

SOFTWARE 1280 IMPLEMENTING DESCRIBED TECHNOLOGIES FOR COMMUNICATION CONTEXT BASED PREDICTED-TEXT SUGGESTIONS

COMMUNICATION CONTEXT BASED PREDICTIVE-TEXT SUGGESTION

BACKGROUND

As mobile devices have become increasingly smaller in size, various user interfaces have been developed for users to enter information. In the past, some traditional input technologies have provided text prediction that has relied on large preinstalled or static dictionaries that consume storage resources. Although text prediction has been done in the past, these traditional input technologies are limited, in part, due to static dictionaries.

SUMMARY

Among other innovations described herein, this disclosure presents various exemplary embodiments of tools and techniques for determining and providing communication context based predicted-text suggestions. According to one exemplary technique, text that recurs in one or more past communications associated with at least one context attribute is determined. Also, a text entry in a text suggestion dictionary is stored. The stored text entry includes the text and metadata associating the text with the at least one context attribute. Using the text suggestion dictionary, at least one predicted-text suggestion for a current communication is determined that is associated with a communication context that includes the at least one context attribute. Additionally, the at least one predicted-text suggestion includes the text.

According to an exemplary tool, a mobile device receives input for a current communication associated with a communication context. Additionally, based on the received input and the communication context, one or more predicted-text suggestions are determined for the current communication using a text suggestion dictionary.

In another exemplary technique, text is determined that recurs in one or more past communications associated with at least one context attribute. Also, a text entry is stored in a text suggestion dictionary. The text entry includes the text and metadata associating the text with the at least one context attribute. In addition, input is received for a current communication associated with a communication context that includes the at least one context attribute. Based on the received input and the communication context, at least one predicted-text suggestion is determined for the current communication using the text entry of the text suggestion dictionary.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

DETAILED DESCRIPTION

This disclosure presents various representative embodiments of tools and techniques for determining and/or providing predicted-text suggestions. The predicted-text suggestions can be generated from text stored in a text suggestion dictionary that is personalized for a user of a device. The text suggestion dictionary can be personalized for the user by storing associations between text and one or more context attributes based on historical use of the text by the user. A predicted-text suggestion can be determined and provided for a communication based on a context of the communication and input received for the communication. The approach of using personalized text suggestion dictionaries and communication contexts to determine predicted-text suggestions can provide predicted-text suggestions that are more accurate suggestions as well as context appropriate for communications of a user.

Figure 1:
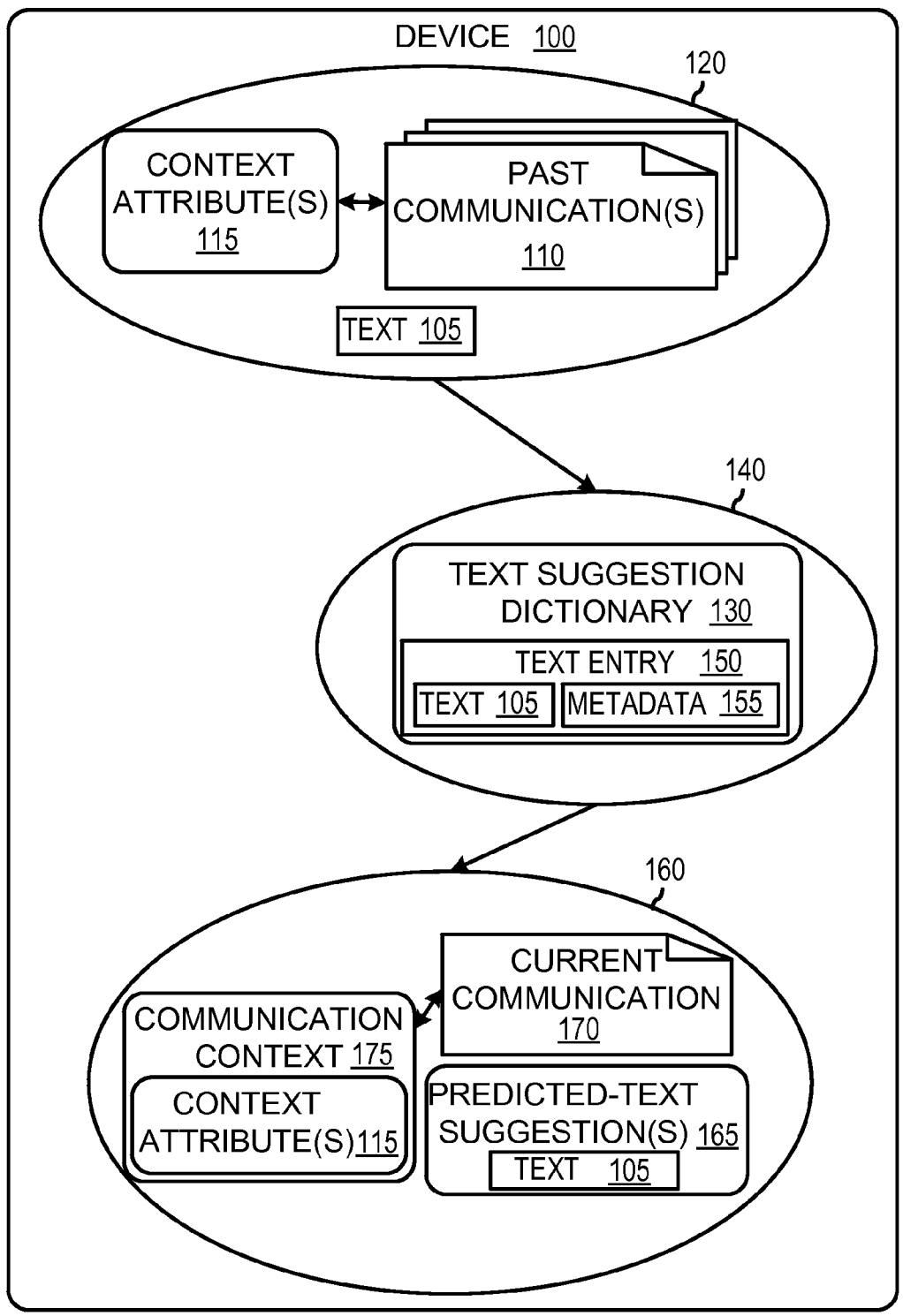
FIG. 1 is a diagram illustrating an exemplary device that can determine a predicted-text suggestion for a current communication associated with a communication context.

Exemplary System for Determining a Predicted-Text Suggestion for a Current Communication Associated with a Communication Context FIG. 1 is a diagram illustrating an exemplary device 100 that can determine one or more predicted-text suggestions 165 for a current communication 170 associated with a communication context 175. In FIG. 1, the device 100 automatically determines that text 105 recurs in one or more past communications 110 associated with at least one user of the device 100 that are also associated with at least one context attribute 115 as shown at 120. Based on the determination that the text 105 recurs in the one or more past communications 110, the text 105 is automatically stored in a text entry 150 in the text suggestion dictionary 130 as shown at 140. For example, the text entry can be a personalized text entry in the text suggestion dictionary 130 for the user of the device 100. The text suggestion dictionary 130 includes one or more text entries that are stored as personalized text entries for the user of the device 100. The text 105 is included in the text entry 150 and associated with one or more context attributes by the metadata 155. The metadata 155 associates the text with the at least one context attribute 115 based on the text being included in past communications that included the at least one context attribute 115. The current communication 170 is associated with the communication context 175 that also includes the at least one context attribute 115.

As shown at 160, the device 100 determines one or more predicted-text suggestions 165, using the text suggestion dictionary 130, for the current communication 170. For example, the predicted-text suggestions are determined from text included in one or more text entries of the text suggestion dictionary 130 that are associated with one or more of the context attributes of the communication context 175 for the current communication 170. The determined one or more predicted-text suggestions 165 include the text 105 that is associated with the at least one context attribute 115 that is included in the communication context 175 for the current communication 170. For example, the one or more predicted-text suggestions 165 can be respective words, phrases, sentences, or other text portions that are likely to complete input entered in the current communication 170. The one or more predicted-text suggestions 165 can be provided as options for selection by a user in a display of the device 100. After a selection is received that selects a predicted-text suggestion, the text included in the predicted-text suggestion is included in the current communication 170. In some implementations, the one or more predicted-text suggestions 165 can be displayed using formatting that indicates that the one or more predicted-text suggestions 165 are personalized predicted-text suggestions determined based on one or more of the context attributes of the communication context 175 for the current communication 170. For example, the one or more predicted-text suggestions 165 can be displayed differently, in whole or in part, from one or more other predicted-text suggestions displayed in a display of the device 100. The one or more predicted-text suggestions 165 can differ in formatting such as in font size, color, bold, italics or the like.

Figure 2:
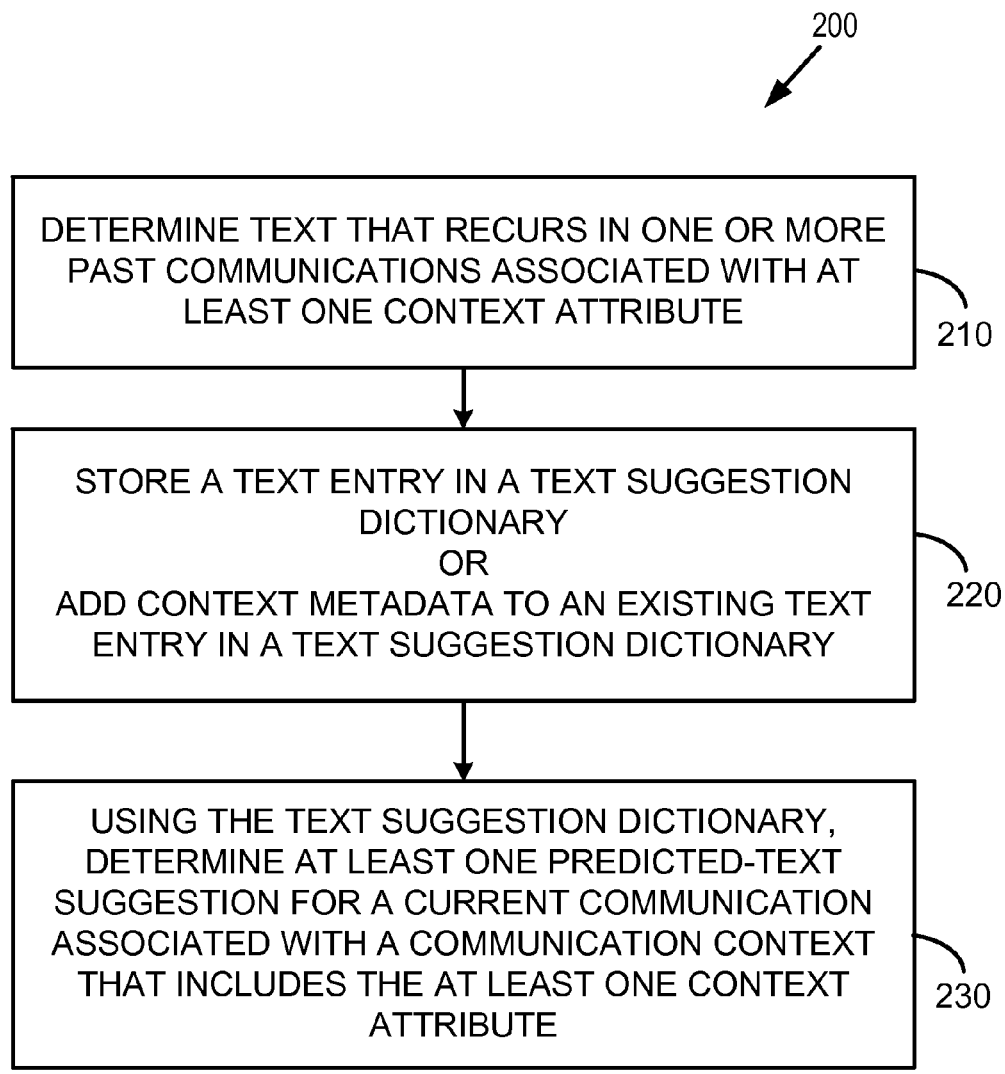
FIG. 2 is a flow diagram illustrating an exemplary method of determining at least one predicted-text suggestion of a current communication associated with a communication context.

Exemplary Method for Determining a Predicted-Text Suggestion for a Current Communication Associated with a Communication Context FIG. 2 is a flow diagram illustrating an exemplary method 200 for determining at least one predicted-text suggestion for a current communication associated with a communication context. In FIG. 2, text that recurs in one or more past communications associated with at least one context attribute is determined at 210. For example, a device can send and/or receive one or more messages of one or more communications between a user and one or more contacts. The messages that have been sent and/or received for a user can be automatically evaluated to determine text that recurs in those messages. For example, a user's input along with input from contacts of the user can be sampled and/or parsed to determine text that is commonly used in communications.

In some implementations, the messages of the past communications can be stored and evaluated locally on a device. For example, one or more messages, such as emails or text messages, stored on a device can be evaluated for words that recur in the messages. In some implementations, the messages of the past communications can be stored and evaluated remotely from a device. For example, one or more messages such as social networking messages can be stored remotely from the device such as by the social network, in the cloud, on another device, or other remote storage. The remotely stored past communications can be evaluated remotely to create information about the past communications that can be received by a device to determine text that recurs in the past communications. For example, the information about the one or more past communications can include information about one or more of a context, a context attribute, a contact, a user, a user identifier (e.g., a user's name, a nickname for the user, or the like) a count of a number of times a text is used, or text of one or more of the past communications.

The information about the past communications can be sent to and received at the device to automatically determine the text that recurs in the one or more past communications associated with the at least one context attribute. In some implementations, a file can be sent to and received at a device such as through a download and the file can include the information about the past communications. The received file can be evaluated at the device to determine text that recurs in the one or more past communications and information that associates the text with context attributes or other metadata.

In some implementations, past communications can occur between a user and one or more contacts through a social network, a website, electronic messages between devices, or other like electronic communications. For example, messages sent between a user and a contact through a social network can be evaluated and the information gathered through evaluation can be received at a device for determining words that can recur in the messages that can be used as personalized text entries in a text suggestion dictionary.

In some implementations, a communication (e.g., a current communication or a past communication) can have or be associated with a communication context. A communication context can include one or more context attributes. The context attributes can reference one or more conditions or circumstances under which the communication occurs or the communication is associated with. Context attributes can include an age attribute, a domain attribute, a contact attribute, a user attribute, a relationship attribute, a time attribute, a technology attribute, an association attribute, subject or topic name attribute (e.g., an indication of a particular subject or topic of the communication such as art, spaceships, or other topic) originating device type attribute, recipient device type attribute, or the like. Information at a device can indicate a communication context for a communication and one or more attributes of the communication context that are associated with the communication. In some implementations, a communication context for a communication can be determined automatically. A communication context can be customized by adding, deleting, or changing of one or more context attributes that are associated with a communication. In some implementations, a communication context can be configured in part by receiving a selection of one or more context attributes provided as options for selection in a predetermined list of context attributes available for configuration in the communication context. For example, a user can use a user interface to configure a communication context by selecting one or more context attributes from a list of context attributes provided as options for selection for the communication context. In some implementations, a communication context can be configured to include one or more customized context attributes in part by receiving the customized context attributes, such as tag names or other context identifiers, in a user interface as added and/or input by a user the device.

In some implementations, a device can store information about one or more contacts. For example, a user can input information that is stored at the device to indicate one or more categories for a respective contact. In some implementations, contact information can include a name, an age, a phone number, an address, classification information, relationship type information (e.g., a friend, customer, sister, mother, or other relationship type) originating device type, recipient device type, or the like. The device can store and/or receive the classification information that can indicate one or more categories for the respective contacts.

In some implementations, some context attributes included in a context can be based on one or more categories for the one or more contacts. The classification information for the contact can indicate that the contact is associated with and/or classified as being within one or more categories. In some implementations, the contact can be within a category such as a relationship type, an age, a group, an organization, a particular demographic, or other category. For example, relationship types can include employer, employee, business, customer, vendor, supervisor, co-worker, family, friend, or the like. The relationship type category can indicate a type of relationship the contact has with a user of the device. In some implementations, the contact can be within an age category that indicates an age of the contact and/or an age range the contact is within. A contact can be within an association category that indicates a group or association that the contact is a member of and/or associated with. A group or association can include a business, a trade group, an educational institution, social organization, or the like.

In some implementations, context attributes indicating an originating or recipient device type (e.g., a desktop computer with a full keyboard, a tablet or phone with a small screen size, or the like) can factor into determining text for inclusion in predicted-text suggestions. In some implementations, the case (e.g., upper case or lower case) of the text suggested can be determined based on the context of a communication. For example, in some communications upper case text can indicate a shouting tone and lower case text can indicate a normal spoken tone.

At 220, a text entry in a text suggestion dictionary is stored. For example, the text determined to recur in the one or more past communications and metadata for the text can be automatically included in a text entry. The text entry and the metadata for the text can be automatically stored in a text suggestion dictionary that is stored by a device. For example, a text suggestion dictionary can grow and/or expand by storing added text entries based on recurring text used in past communications. In some implementations, if the text determined to recur is already included in a text suggestion dictionary for the device, the text included in the text suggestion dictionary can be linked with metadata that associates the text with one or more context attributes of the past communications that include the text for future text suggestion evaluation. In some implementations, if the text determined to recur is already included in a text suggestion dictionary, a count of the number of times the text is used can that is included in the metadata for the text can be incremented. In some implementations, text included in a message sent by a user can be automatically stored in a text entry of the text suggestion dictionary in response to a determination that the text is not already in the text suggestion dictionary associated with the user. For example, a user can enter a word that is not included in a dictionary of the device and the word can be automatically included and stored in a text entry that is associated with the user.

In some implementations, text that is determined to have been used a number of times in past communications that is greater than a threshold number can be stored in a text entry for a text suggestion dictionary. For example, a number of the times the text is used in past communications that are associated with a user can be counted to produce a count associated with the text. When the count reaches or exceeds a threshold number the text can be automatically added to the text suggestion dictionary to be managed in a text entry for use in predicting predicted-text suggestions for the user. In some implementations, the threshold number can be a predetermined number. A count associated with text can be compared to a threshold number to determine that the count reaches, exceeds, or falls below the threshold number. In some implementations, a statistical approach can be used to determine text that recurs in past communications. For example, a histogram determined using frequencies of the use of various texts, such as words, phrases, of sentences, in communications can be used.

A text suggestion dictionary can include one or more text entries that can be used to generate and/or determine predicted-text suggestions for a user of a device. A text entry can be a personalized text entry such that the text entry is associated with one or more users of the device to allow for personalized predicted-text suggestions. A text suggestion dictionary can include popular entries that include text such as words and/or phrases without associating the words and/or phrases with one or more context attributes and/or users. The text included in popular entries can be common and/or popular words, phrases, sentences or other text portions that are commonly used in communications. For example, the device can download a file of a dictionary of popular and/or common words and include the words in popular entries in a text suggestion dictionary on the device. Text used in popular entries can also be used in text entries that are personalized for one or more users.

A device can have one or more text suggestion dictionaries. In some implementations, a text suggestion dictionary can include text entries that are personalized and popular entries. Popular entries can be common words of a dictionary that are not associated with a user. In some implementations, a device can have separate text suggestion dictionaries for popular entries and personalized text entries. For example, a text suggestion dictionary personalized for the user can include text entries associated with a user. In some implementations, a device can include a text suggestion dictionary that includes popular and/or common entries that include common words and/or text, that can be included in predicted-text suggestions that are not associated with and/or personalized for a particular user of a device. For example, a device can include a traditional dictionary of words and/or vocabularies used for text prediction.

In some implementations, a device can have one or more text suggestion dictionaries that are associated with respective users of the one or more users of the device. In some implementations, a text suggestion dictionary can include text entries, associated with a user of a device, that are also associated with one or more technologies. For example, a user can use a different lexicon when writing emails than when writing text messages. Accordingly, a device for the user can include a text suggestion dictionary that includes text associated with emails for use in suggesting predicted-text suggestions when the user is generating an email communication and the device can also include another text suggestion dictionary that includes text associated with text messages for use in suggesting predicted-text suggestions when the user is generating a text message. In some implementations, the device can store separate metadata for respective contexts. For example, a device can store a copy of a word in a text suggestion dictionary and also multiple databases with respective metadata for various contexts. In some implementations, a text suggestion dictionary can be implemented and/or viewed as a contextual graph where the words or other text portions are nodes and the nodes are linked through edges with metadata indicating the associations with context attributes or other information. In some implementations, weights of edges can represent reference count, importance, or the like.

In some implementations, the metadata can include information that indicates one or more context attributes that are associated with the text included in the text entry. For example, the metadata of the text entry is generated such that it associates the text of the text entry with one or more of the context attributes of the one or more past communications that included the text of the text entry. The metadata for the text can include a count of the number of times the recurring text has been used in the one or more past communications. For example, the count in the metadata can be incremented when a user of the device that is associated with the text entry uses the text in a communication. The count of the metadata can track how many times a user uses the text in communications. The count can be used to rank a text entry for use in predicted-text suggestions.

The metadata can include information associating the text with one or more modes. For example, the device can be set to a mode and the text associated with the mode by its metadata can be included in predicted-text suggestions while the device is in the mode. In some implementations, a device can be set to a child mode (e.g., an enabled Kids Zone or the like) and text that is associated with a child mode can be included in predicted-text suggestions while the device is in the child mode. For example, text entries associated with a child mode can include text that is determined appropriate for communications with and/or involving children.

In another example, a mode can be set for suggesting predicted-text suggestions for communications with a particular contact. For example, a mode set for a contact can allow predicted-text suggestions that are appropriate for communicating with the contact for one or more purposes such as for work, for socializing, for family matters, for casual communication, for business, or other like purpose for communicating. Predicted-text suggestions determined for suggestion to the user can vary depending on the mode that is associated with the contact at the time the communication is being generated. For example, if a business mode is set for a contact a word that is associated with a business mode in a text suggestion dictionary can be suggested in a predicted-text suggestion. In another example, if a socializing mode is set for the contact a word that is associated with a socializing mode in a text suggestion dictionary can be suggested in a predicted-text suggestion. In some implementations, the metadata can include preceding text information or do-not-follow information that can be associated with the text of the text entry.

In some implementations, a mode can be set for suggesting predicted-text suggestions for communications with a particular contact based on an application being used. In exemplary implementations, for a contact that has a work relationship type with a user, a mode can be set that when communicating with the contact using a public communications application (e.g., a blogging application, a microblogging application, a social networking application, or the like) the predicted-text suggestions can be allowed that include non-work related common dictionary text. Also for example, the mode can be set such that when using private messaging features, instead of public posting features, of the application in communications with the contact, predicted-text suggestions can be determined and/or provided that include text determined based on an enterprise.

With reference to FIG. 2 at 230, at least one predicted-text suggestion is determined for a current communication associated with a communication context that includes the at least one context attribute. For example, a user can generate and/or write a message at the device for a current communication that has a communication context that includes the at least one context attribute and a predicted-text suggestion can be determined for the current communication based in part on the context of the current communication. The predicted-text suggestion can include text from a text entry that includes metadata that indicates that the text is associated with one or more of the context attributes of the communication context for the current communication.

A predicted-text suggestion can be provided as an option for selection in a display of the device. In some implementations, a predicted-text suggestion provided can be a word, phrase, or sentence that can likely complete the input entered in the communication. After a selection is received selecting the predicted-text suggestion, the text included in the predicted-text suggestion can be included in the current communication. The determined predicted-text suggestions can suggest jargon determined to be appropriate between the user and the contact for the communication based on previous communication patterns. In some implementations, predicted-text suggestions can be determined and/or provided for word completion. For example, as a user continues to type letters of a word into a text edit field, the determined and/or provided predicted-text suggestions can change, be updated, or adapt based on the most current letters input by the user as the letters of the word continue to be entered.

Exemplary Text Suggestion Dictionary

Figure 3:
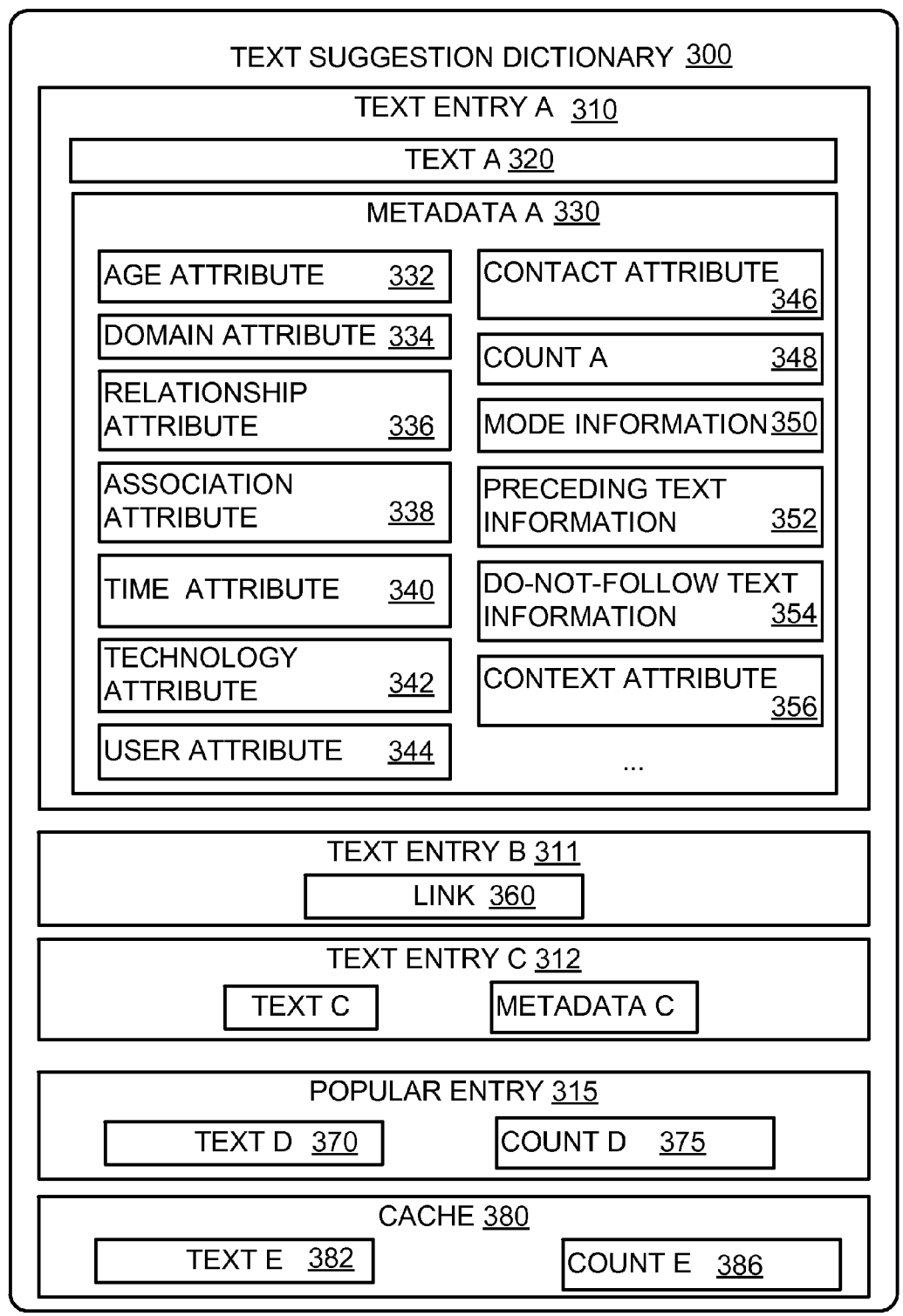
FIG. 3 is a diagram illustrating an exemplary text suggestion dictionary.

FIG. 3 is a diagram illustrating an exemplary text suggestion dictionary 300. In FIG. 3, the text suggestion dictionary 300 includes one or more text entries such as text entries 310, 311, and 312. The text suggestion dictionary can be a data source for predictive text suggestion such as for determining one or more predicted-text suggestions. In some implementations, the text suggestion dictionary 300 can be a database or other information store. As shown in FIG. 3, the text suggestion dictionary 300 includes one or more popular entries such as popular entry 315. The text entry 310 includes text 320 and metadata 330. The metadata 330 can include information about the text 320 of the text entry 310 and the information associates the text 320 with context attributes and other information.

The metadata 330 includes information such as the age attribute information 332, the domain attribute information 334, the relationship attribute information 336, the association attribute information 338, the time attribute information 340, the technology attribute information 342, the user attribute information 344, the contact attribute information 346, the count information 348, the mode information 350, the preceding text information 352, do-not-follow text information 354, and the context attribute information 356.

The age attribute information 332 associates text 320 with an age attribute that indicates an age or age range. For example, an age attribute can be based on an age and/or age range of one or more contacts. In an exemplary implementation, an age and/or age range of the one or more contacts that the user is communicating with can be used for an age attribute. In some implementations, an age range or an age threshold can be used if there are legal issues regarding storing personally identifiable information (e.g., age information or the like) of one or more users on a device or in the cloud.

The domain attribute information 334 associates text 320 with a domain attribute that indicates one or more domains. In some implementations, a domain attribute can be based on one or more domains of a communication. In some implementations, a communication can have a domain such that the communication is for work, for business, for socializing, for communicating about a subject area or topic, for education, or other like domain.

The relationship attribute information 336 associates text 320 with a relationship attribute that indicates one or more relationship types. In some implementations, a relationship attribute can be based on a relationship between a user of a device and a contact. For example, a relationship can include a friend, spouse, co-worker, employer, employee, business associate, customer, vendor, supervisor, family, social network contact status, or the like.

The association attribute information 338 associates text 320 with an association attribute that references one or more groups or organizations. In some implementations, an association attribute can be based on a group or organization that a contact of the communication is a member of and/or is associated with. For example, an association attribute for a communication can indicate that the contact belongs to a professional, social, or business group or organization.

The time attribute information 340 associates text 320 with a time attribute that indicates one or more times or time ranges. In some implementations, a time attribute can be based on a time that the communication occurred. The time or time range that a communication is or was conducted (e.g., sent and/or received) can be the time attribute for the communication's communication context. For example, a time range can include before, during, or after work hours, morning, evening, daytime, nighttime, or other range of time.

The technology attribute information 342 associates text 320 with a technology attribute that indicates one or more technologies associated with a communication. In some implementations, a technology attribute can be based on one or more technologies used to conduct one or more communications. For example, a communication can have a technology attribute that indicates the communication was conducted (e.g., generated, sent or received) using a technology such as one or more of a software application, an edit field, an email, a text message, a social network, or other like technology. In some implementations, the technology attribute can indicate the communication was conducted (e.g., generated, sent or received) using a type of a device. In some implementations, words or other text can be associated, through technology attribute information, with different types of devices (e.g., a desktop computer, a phone, a tablet, or the like) based on communications relevant to the device type. For example, communications generated using a phone with a small screen can be associated with emoticons, such as ;), where a right parenthesis follows a semicolon input. However communications generated on a desktop with a full keyboard can be associated with standard punctuation rules and therefore an input of a semicolon can be determined to join related sentences so a following parenthesis would not be expected.

In some implementations, a technology attribute can track and indicate one or more applications into which text was input at the time it was generated in respective past communications. In some implementations, technology attribute information can be used to determine, suggest, and/or provide predicted-text suggestions that are more common for one or more types of applications. For example, the frequency of the text can be determined and the relevance between applications such as a word processor, email, posting to a social networking news feed, or the like can be determined. In some implementations, a technology attribute for a communication can be used to make a decision not to add input text to a text suggestion dictionary. For example, if the input text is text input into a webpage password input field, the text can be determined not to be stored in a text suggestion dictionary. In some implementations, the technology attribute can also track context within an application. For example, a technology attribute can track a particular email thread that is being responded to that includes one or more users in a contact list. When responding to the email thread, this technology attribute information can be used to offer predicted-text suggestions that include words previously included in the email thread and then also provide predicted-text suggestions that include words used with the one or more contacts in other past communications other than the email thread. For example, other recent communications using one or more other applications or technologies such as a web chat or text message exchanged in the past month. In some implementations, the respective names of the contacts in an email thread can be text in a text entry and the names can be associated with the thread. For example, the names of contacts associated with email addresses in the To: and/or Cc: line of the email can be associated with the email thread. Such an association can be used to provide a name as a predicted-text suggestion when a user types a portion of the name in a To: and/or Cc: line of an email for the thread and the typed portion is received as input.

The user attribute information 344 associates text 320 with a user attribute that references a user of the device that includes the text suggestion dictionary 300. In some implementations, a user of a device can be a person, a group, a business, or other entity that uses the device and/or that has accesses or an account for using the device for sending and/or receiving communications. In some implementations, a user can have a profile stored on the device with information about the user such as one or more categories and or demographics that the use is associated with.

The contact attribute information 346 associates text 320 with a contact attribute that references a contact. In some implementations, a contact attribute can be based on one or more contacts or parties that a communication is sent to and/or received from as part of communications with a user of a device. For example, the contact attribute can indicate one or more contacts that the communication was used to and/or is intended to communicate with. A contact can be a person, business, or other entity that a user drafts and/or sends a message to and/or receives a message from for communication. In some implementations, the contact can be reference by a name or other identifier.

The count information 348 indicates a count of a number of times the text 320 has been used in one or more past communications.

The mode information 350 associates the text 320 with one or more modes. For example, a mode can be a child mode that allows text determined to be appropriate for children to be included in predictive-text suggestions.

The preceding text information 352 associates the text 320 with one or more instances of text, such as words, phrases, sentences, or other text portions, such that if used in a communication can prompt the text 320 to be included in a predicted-text suggestion that would follow the one or more instances of text in a response message. Preceding text information for a text entry can be based on text included in one or more communications received by a user from one or more contacts that the user responded to using the text of the text entry. For example, a user of a device can send a response message as a response to a previously received message from a contact that includes particular text. The text sent in response can be a recurring response from the user of the device after receiving a message that includes the particular preceding text. For example, preceding text information for a text entry can indicate that the text "yes" of the text entry can be used for predicted-text suggestions when input is received that includes and/or a contact has sent preceding text that includes the words "are you on your way."

The do-not-follow text information 354 associates the text 320 with one or more instances of text such that if at least one of the instances of text is used in a communication the text 320 will not be included in a predicted-text suggestion that immediately follows the at least one instance of text.

The text entry 311 includes a link 360 to another text entry in another text suggestion dictionary to reference text and its metadata that are stored in another text suggestion dictionary stored on the device. The referenced text and its metadata can be used as the text and metadata for the text entry 311 in determining predicted-text suggestions. For example, a text entry in another dictionary can be duplicated in and accessible to the text suggestion dictionary 300 by using the link to the text entry in the other dictionary. Using links between duplicated text entries in various text suggestion dictionaries can save storage space.

The popular entry 315 of text suggestion dictionary 300 includes text 370 that can be used for and/or included in a predicted-text suggestion. The popular entry also includes a count 375 of a number of times the text 370 has been used in past communications. The text suggestion dictionary 300 also includes a cache 380 that can store text associated with a user and count information such as text 382 that is associated with count information 386.

The text entries of the text suggestion dictionary 300 that are personalized for a user can be downloaded to be included in a text suggestion dictionary of other devices. For example, the user of a device can download the user's personalized text entries to a different device so that personalized predicted-text suggestions can be generated for the user on the different device using the downloaded text entries included in the text suggestion dictionary of the different device.

The contents of the text suggestion dictionary 300 can be maintained and/or updated when predicted-text suggestions are selected from the suggestion list during device operations. During maintenance and/or update, the metadata 330 and the included information such as information 332 334, 336, 338, 340, 342, 344, 346, 350, or 352 can be updated with the current information available.

In some implementations, a text suggestion dictionary 300 can be a database from which text (e.g., words or the like) are selected for inclusion in predicted-text suggestions that are provided as candidates for selection based on criteria such as the metadata 330. In an exemplary implementation, the words determined for inclusion in predicted-text suggestions for a particular current communication can include words previously used in past communications with a contact (e.g., a particular or identified contact) within a range of time (e.g., a number of days, months, or other range of time) by filtering the text suggestion dictionary database for the union of words that are associated with and/or match the contact as indicated by contact attribute information for the words and that are associated with and/or match the range of time as indicated by time attribute information for the words.

In some implementations, when a contact is deleted from a contact list on the device (e.g., a phone) the metadata stored in text suggestion dictionaries of the device that associates text with the contact can be updated to remove and/or change the association or information related to the deleted contact by updating respective contact attribute information for text entries. In some implementations, the text suggestion dictionary 300 can have maintenance that removes text entries that include text (e.g., words or the like) that have not been used in a range of time (e.g., the past 90 days or other range of time) or other based on other criteria. Periodically removing text entries based on criteria can keep the database to a manageable size pool of relevant text for inclusion in predicted-text suggestions.

Figure 4:
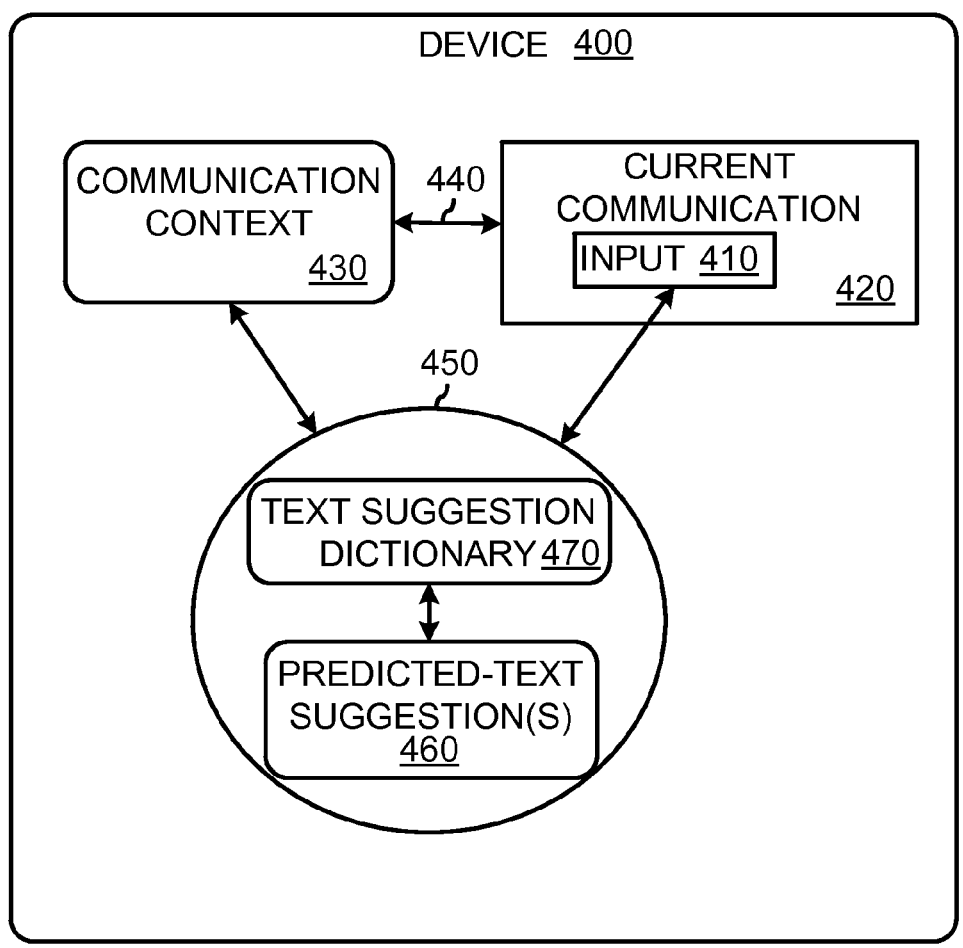
FIG. 4 is a diagram illustrating an exemplary device that can use a text suggestion dictionary in determining a predicted-text suggestion based on input and a communication context.

Exemplary System for Using a Text Suggestion Dictionary in Determining Predicted-Text Suggestions Based on Input and a Communication Context FIG. 4 is a diagram illustrating an exemplary device 400 that can use a text suggestion dictionary to determine a predicted-text suggestion for a current communication based on input and a communication context. In FIG. 4, the device 400 receives input 410 for a current communication 420. The current communication 420 is associated with the communication context 430 as shown at 440. For example, the current communication 420 can have one or more context attributes that comprise the communication context 430 for the current communication 420. As shown at 450, the device 400 determines one or more predicted-text suggestions 460 for the current communication 420 using a text suggestion dictionary 470. The one or more predicted-text suggestions 460 are determined based on the communication context 430 and the input 410 for the current communication 420.

Figure 5:
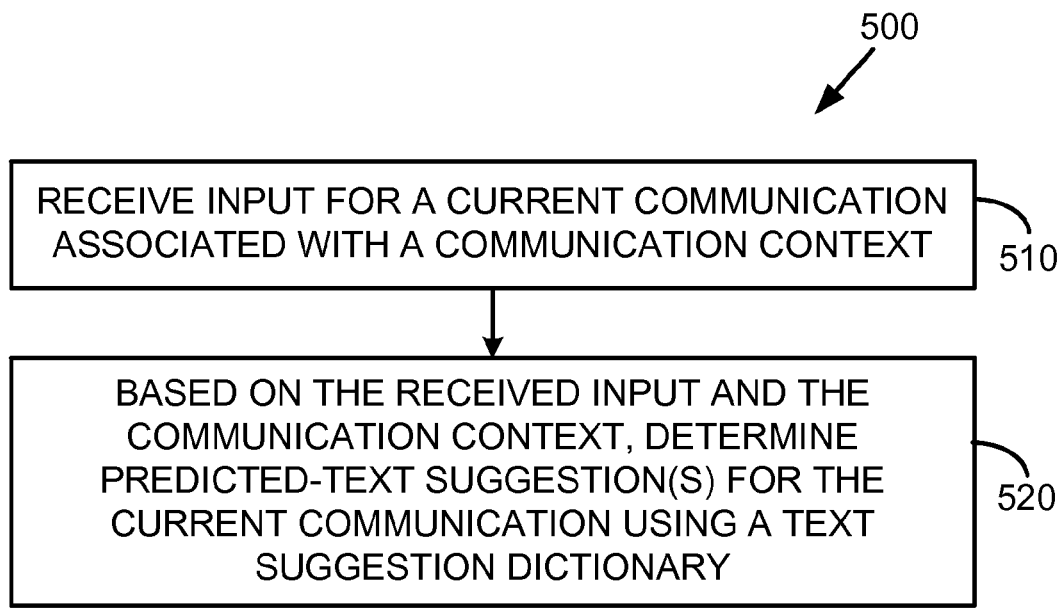
FIG. 5 is a flow diagram of an exemplary method for using a text suggestion dictionary in determining one or more predicted-text suggestions based on input and a communication context.

Exemplary Method for Using a Text Suggestion Dictionary in Determining Predicted-Text Suggestions Based on Input and a Communication Context FIG. 5 is a flow diagram of an exemplary method 500 for determining one or more predicted-text suggestions for a current communication using a text suggestion dictionary based on input and a communication context. In FIG. 5, input for a current communication associated with a communication context is received at a device at 510. For example, text input and/or voice input can be received at a device to generate a communication such as a message. In some implementations, input can be entered by a user through a user interface such as a keyboard, virtual keyboard, voice recognition, or the like. In some implementations, voice input received at the device can be converted to text input at the device. In some implementations, when voice input is received from a user, a speech recognition engine can use a text suggestion dictionary personalized for the user to produce predicted text in combination with the voice input.

Text input can be received in an editable text field of an application of the device. In some implementations, the input can be text included in a message from a contact. For example, a text message from a contact can be parsed and a predicted-text suggestion based on that input can be provided. In some implementations, text input can be one or more letters, character strings, words, phrases, sentences, or other text portions. The input text can be used to generate a message for a communication. The current communication can be associated with and/or have a communication context that includes one or more context attributes.

At 520, based on the received input and the communication context, one or more predicted-text suggestions are determined for the current communication using a text suggestion dictionary. For example, a text suggestion service of a device can reference one or more data sources such as the text suggestion dictionary to determine predicted-text suggestions based on input received from a user. In some implementations, text that is likely to complete the input is determined for inclusion in one or more predicted-text suggestions using the received input and the communication context. In some implementations, one or more text entries can be determined to include text that includes the input text. For example, the input text can be a partial word, phrase, or sentence and the text of a text entry can include the completed word, phrase, or sentence. In some implementations, the input text can be compared to the text included in text entries to determine which text entries include the input text, include portions of the input text, or can be substituted for the input text.

A predicted-text suggestion can include words, phrases, or sentences that are determined to likely complete the input. For example, a predicted-text suggestion can include a completed word that completes a partial word entered as input. In another example implementation, a predicted-text suggestion can be determined that includes text of a text entry that is determined to be a likely correct spelling of a word, phrase, sentence or other text portion based on the input. For example, input can be received at the device and the input is a word that is misspelled. A predicted-text suggestion that includes the correctly spelled word can be determined based on the input and provided for selection. When the predicted-text suggestion is selected it can replace the incorrectly spelled word in the communication.

A text suggestion dictionary can include many dictionary entries such as text entries and/or popular entries. When there are various dictionary entries that can be used to generate and provide predicted-text suggestions for an input, the dictionary entries can be ranked to determine which dictionary entries are to be selected for use in the determined predicted-text suggestions for the input. For example, if multiple text entries can be used for inclusion in respective predicted-text suggestions for the input, a text entry that is of a higher rank than another text entry can be selected for and/or determined for use in generating and providing a predicted-text suggestion for the input. In some implementations, the text entries can be ranked in part based on the input. In some implementations, a rank can be based in part on a count of the number of times the text of the text entry has been used in prior communications. For example, a first text entry with metadata that indicates a count that is greater than a count indicated in metadata of a second text entry can be ranked higher than the second text entry. In some implementations, a rank can be based in part on grammar. For example, if the text of a first text entry is determined to be a possible grammatically correct next word, phrase or sentence to follow text in the communication, then the rank of the first text entry can be higher than the rank of a second text entry that is determined not to be a likely grammatically correct next word.

In some implementations, popular entries in a text suggestion dictionary can also be ranked and text entries that are personalized for a particular user can be compared to the rank of the text entries that can be selected for use in a predicted-text suggestion. For example, a device can provide one or more predicted-text suggestions that include text from popular entries along with one or more predicted-text suggestions that include text from text entries that are personalized for and/or associates with a particular user of the device. In an exemplary implementation, text entries that are personalized for a user can be ranked higher than popular entries that are not personalized for the user. The text associated with the user can be determined to provide a more likely candidate for completing the input that the popular entry based on the user's past communications.

In some implementations, after a text entry is determined to include the input text and/or a portion of the input text, the metadata of text entry can be used to determine if the text entry is associated with one or more context attributes of the context of the current communication. For example, context attributes indicated as associated with the text of the text entry can be compared to the context attributes of the current communication's context to determine if the text entry includes one or more indications of context attributes that are included in the current communication's context. If the text entry metadata includes indications of one or more of the context attributes of the current communication's context, then the text of the text entry can be included in a predicted-text suggestion for the input.

The determined one or more predicted-text suggestions can be provided as options for selection in a display of the user interface.

Figure 6:
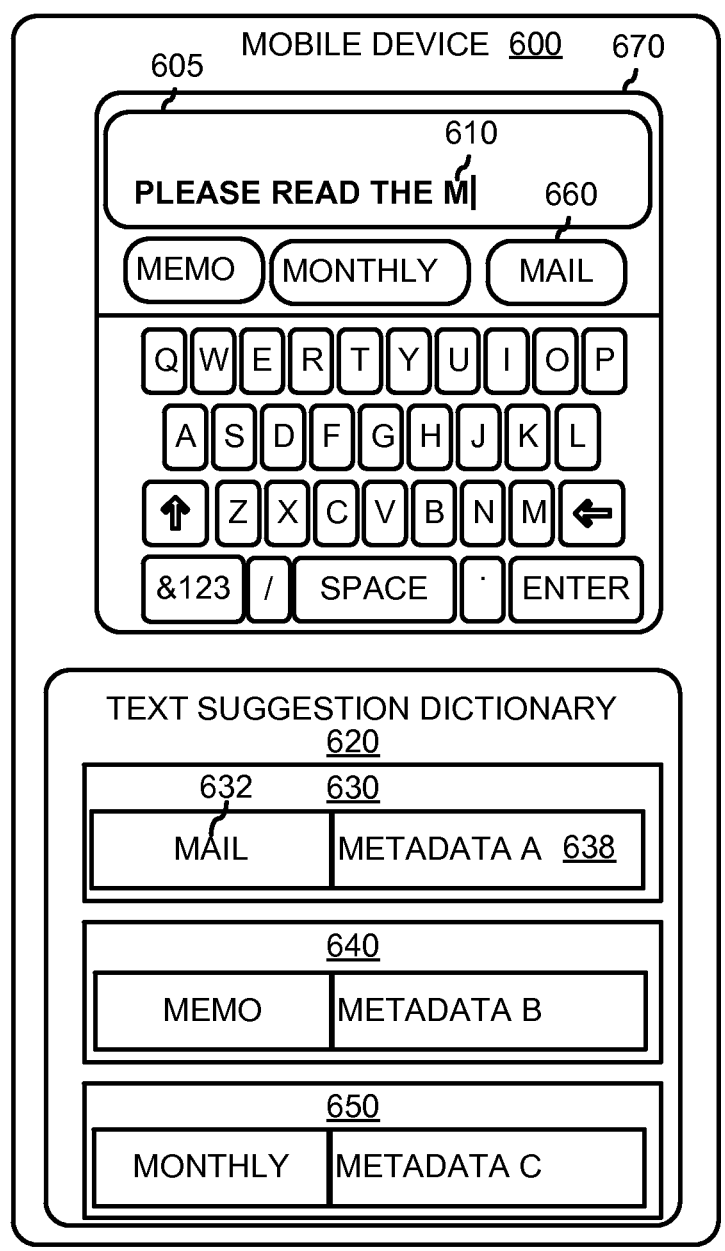
FIG. 6 is a diagram illustrating an exemplary mobile device that provides one or more predicted-text suggestions based on an input and a communication context.

Exemplary System for Providing Predicted-Text Suggestions for a Current Communication Based on Input and a Communication Context FIG. 6 is a diagram illustrating an exemplary mobile device 600 that provides one or more predicted-text suggestions for a current communication 605 based on an input 610 and a communication context of the current communication 605. In FIG. 6, the current communication 605 is a text message being drafted by a user of the mobile device 600. The current communication 605 is for work purposes, so the context of the current communication includes a context attribute of a domain that is a work domain. The input 610, in the example, is the letter "M" and the text suggestion dictionary 620 includes text entries 630, 640, and 650 that include text that are associated with a work domain context attribute. The text 632 is the word "MAIL" and has metadata 638. The metadata 638 associates the text 632 with a work domain context attribute and is referenced to determine that the text 632 is associated with the work domain context attribute.

The input 610 is the first letter of the text 632 so the text 632 includes the input 610. Based on the determination that the text 632 is associated with a work domain context attribute which is also a context attribute included in the context of the current communication, the text 632 is included in a predicted-text suggestion 660. The predicted-text suggestion 660 is provided in a display 670 of the mobile device 600 as an option for selection by a user. When a selection of the predicted-text suggestion 660 is received the text of the predicted-text suggestion can be included in the communication to complete the input 610 and/or to change the input 610 to the text 632. After the predicted-text suggestion 660 is selected so that its text can be used in the current communication 605, the metadata 638 of text entry 630 can be updated based on the text 632 being selected for use in the current communication 605.

Figure 7:
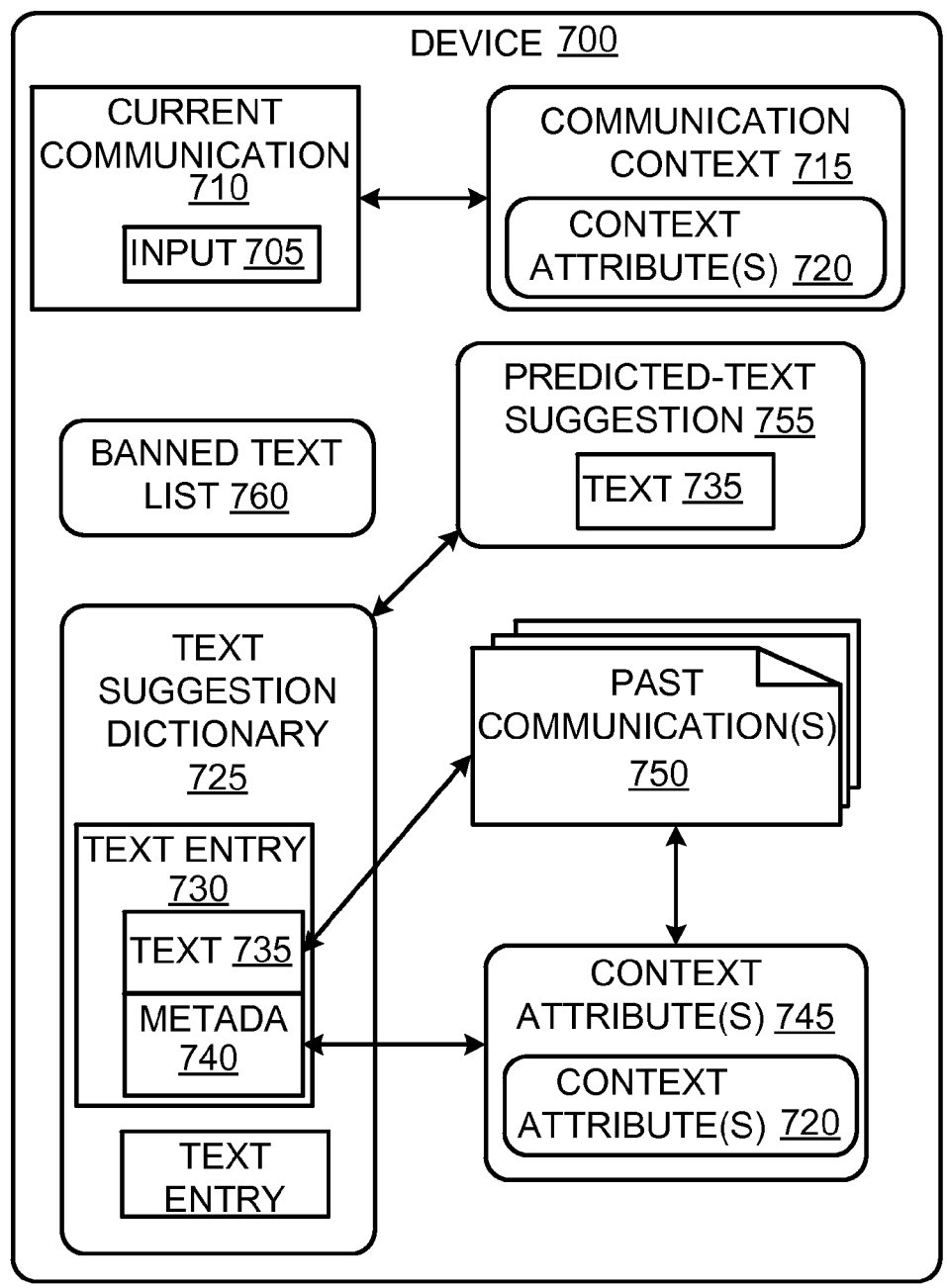
FIG. 7 is a diagram illustrating an exemplary device that can use metadata in a text suggestion dictionary in determining predicted-text suggestions based on input and a communication context.

Exemplary System for Using Metadata in a Text Suggestion Dictionary in Determining Predicted-Text Suggestions Based on Input and a Communication Context FIG. 7 is a diagram illustrating an exemplary device 700 that uses metadata in a text suggestion dictionary in determining one or more predicted-text suggestions for a current communication based on input and a communication context.

In FIG. 7, the device 700 receives input 705 for current communication 710. In some implementations, a device can include a computing device such as a mobile device.

The current communication has a communication context 715 that includes one or more context attributes 720. In some implementations, a communication can be one or more messages sent between a plurality of parties (e.g., one or more users and/or contacts) using one or more electronic messaging technologies such as an email, a Short Message Service (SMS) message, a Multimedia Messaging Service (MMS) message, an electronic instant message, a social networking message, an internet message, or the like. Past communications can include one or more communications that have been previously sent or received by one or more parties. A party to a communication can be a person and/or entity that drafts and or sends the communication or a contact that receives or is the intended recipient of the communication. In some implementations, a current communication can include a communication and/or message that is being generated and/or drafted that can be sent to communicate with one or more contacts.

The device 700 includes a text suggestion dictionary 725 that includes one or more text entries such as text entry 730. The text entry 730 includes text 735. The text entry 730 also includes metadata 740 for the text 735. The metadata 740 associates the text 735 of the text entry 730 with the one or more context attributes 745 of the one or more past communications 750.

The one or more context attributes 745 include the one or more context attributes 720 that are also included in the communication context 715 for the current communication 710. The device 700 determines one or more predicted-text suggestions that include text from one or more text entries such as predicted-text suggestion 755. The predicted-text suggestion 755 is provided as a suggestion for text to complete the input 705 for the current communication 710 based on the communication context 715 of the current communication 710. Predicted-text suggestion 755 includes the text 735 which is associated with the one or more context attributes included in the communication context 715 for the current communication 710 as indicated by the metadata 740 of the text entry 730.

The device 700 includes a banned text list 760. The banned text list 760 can include text that is banned for inclusion in a predicted-text suggestion and/or a text entry. For example, the words included in a banned text list can be words that are not desired by a user of the device to be suggested as options for predicted-text suggestions. When determining a predicted-text suggestion for an input of a communication, the banned text list 760 can be referenced and predicted-text suggestions can be chosen and/or determined that include words that are not banned by the banned text list 760. In some implementations, text that is banned by the banned text list can be banned from predicted-text suggestions based on a context of a communication or a mode of the device. For example, if a child mode is set for the device the banned text list can be used to ban words that are determined to be inappropriate for children. In some implementations, a user of a device can enter text to be banned by a banned text list. In other implementations, a word can be selected to be added to a banned text list to be banned when the text is presented to a user as a predicted-words suggestion for selection.

Figure 8:
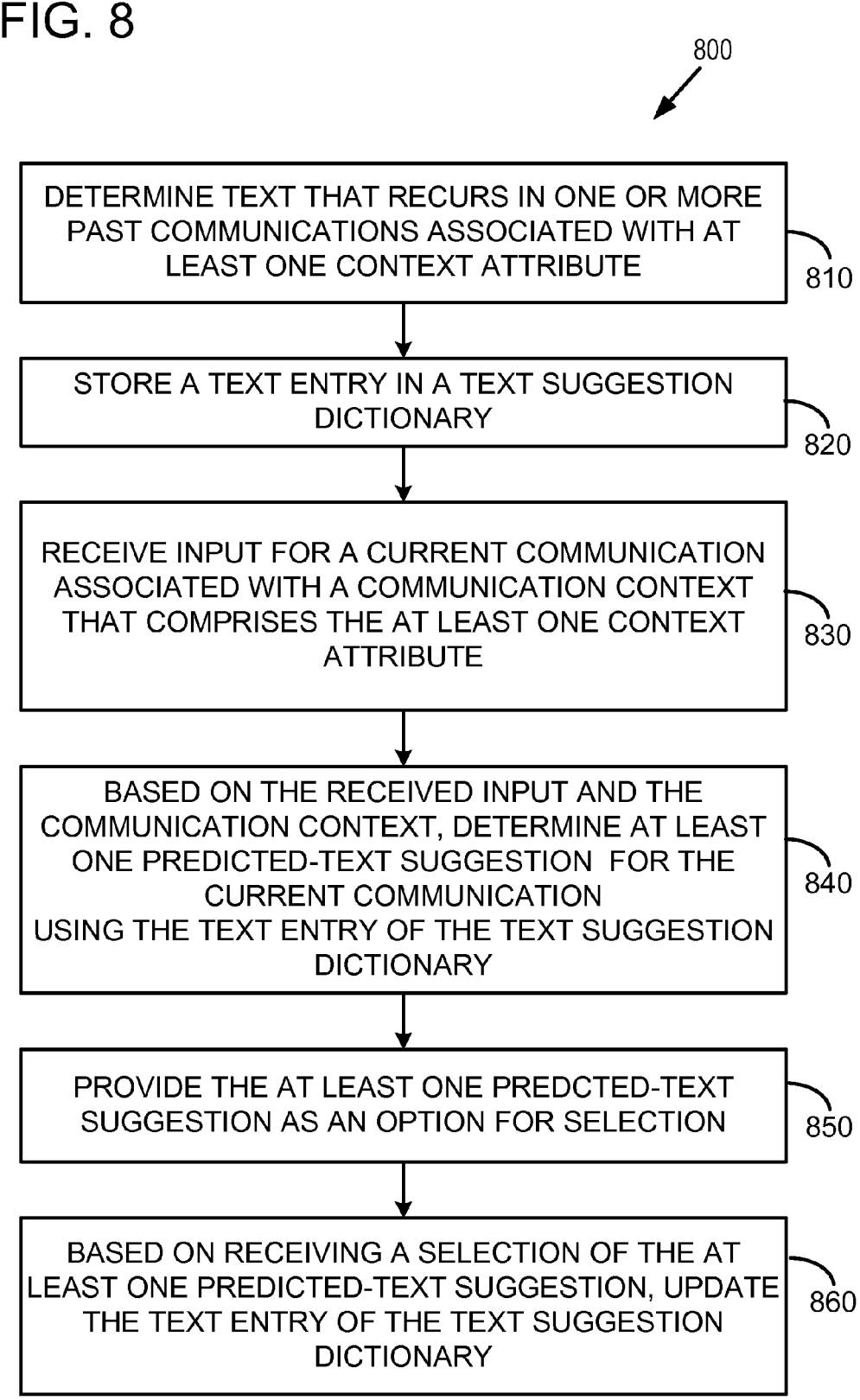
FIG. 8 is a flow diagram illustrating an exemplary method for using a text entry of a text suggestion dictionary in determining predicted-text suggestions based on input and a communication context.

Exemplary Method for Using a Text Entry in Determining Predicted-Text Suggestions Based on Input and a Communication Context FIG. 8 is a flow diagram illustrating an exemplary method 800 for determining one or more predicted-text suggestions for a current communication based on input and a communication context using a text entry. In FIG. 8, text that recurs in one or more past communications that is associated with at least one context attribute is determined at 810. For example, words, phrases, or sentences that occur multiple times in one or more past communications can be found by evaluating the text included in the past communications. The past communications can be associated with respective communication contexts that include one or more context attributes.

In some implementations, past communications can be evaluated periodically. The evaluation can determine text that recurs in the communications or can determine information for updating one or more text entries of a text suggestion dictionary. For example, text that is not in a text entry of a text suggestion dictionary associated with a user of the device can be determined to recur in one or more communications with the user for adding to a text entry in the text suggestion dictionary for the user.

In some implementations, evaluating the past communications and communication contexts of the past communications can determine information for updating one or more text entries for a text suggestion dictionary. When the past communications that are associated with a user of the device are evaluated, text entries that include text used in the evaluated communications can be updated. For example, a text entry metadata can be updated based on the evaluations of the past communications to update count information, preceding text information, mode information, associations with one or more context attributes, an association with a contact, an association with a user, or other like metadata information can be updated. By evaluating past communications associated with a user and updating a text suggestion dictionary personalized for the user, a text suggestion dictionary can store text often used in communications that the user has participated in. Storing a personalized text and/or a lexicon for a user of the device in a text suggestion dictionary can allow for determining and providing predicted-text suggestions that include text that the user has often used in the past. Past communications can be stored in a message history of a device, and updating the metadata in the text suggestion dictionary can be done during a maintenance task such as when the device is inactive and/or connected to power (e.g., connected to AC power, or the like) or done in real-time as the text information is input. In some implementations, for text suggestion dictionaries maintained in the cloud, the text suggestion dictionaries can be updated and/or downloaded when the device is connected to the Internet through a designated technology (e.g., Wi-Fi, Wi-Fi only, or other technology).

The information of a user or a device can be protected by a user selecting to opt-in or opt-out of having communications and information automatically evaluated for automatic storing of information in text suggestion dictionaries and/or for automatically determining predicted-text suggestions as described herein. In some implementations, based on an opt-in or opt-out setting included in the device, information can be blocked from being included in text entries and/or evaluated in past communications, such as during the determining of text that recurs in past communications and/or during evaluation of past communications for updating text entries. In some implementations, a communication or other information available to the device, such as documents, data, or the like, can be set to be blocked from evaluation. For example, a communication that includes private, sensitive, and/or financial information can be blocked from evaluation for recurring text.

The private, sensitive, and/or financial information can be blocked from being included in a text entry in a text suggestion dictionary. For example, personally identifiable information, sensitive, financial, or private information can be set to be blocked from being included in text entries in text suggestion dictionaries and/or evaluated (e.g., accessed, read, parsed, or the like) for updating or generating text entries. Also, information about context attributes and/or contact categories can be blocked from being associated with a communication when evaluated. For example, a category, such as a type of relationship, for a contact can be blocked from being used in a communication context for a communication with the contact. Information can be blocked from being accessed during an evaluation of a communication and/or blocked for use in storing or updating information in a text suggestion dictionary. In some implementations, based on one or more settings of a device, some information can be blocked for a communication and/or contact and some information can be allowed to be evaluated for the communication and/or contact. Allowing one or more settings for blocking information for use in automatically storing text for determining predicted-text suggestions can provide a way to protect information. Also, a user of a device can turn on or off the predicted-text suggestions that are personalized for the user. In some implementations The metadata stored for text can also be configured to exclude one or more types of input or information such as input in password input fields on webpages or applications and/or input in applications and websites such as online banking websites or websites where private personal information (e.g., medical information, financial information, or the like) is entered.

In some implementations, information can be protected by securely storing the information such as information gathered through evaluation of communications and/or stored in text suggestion dictionaries. In some implementations, information that is automatically gathered and/or stored from evaluation of communications or data included in a device can be available for user access. For example, a device can provide information and/or a user interface for providing a user access to view, modify, or delete the information stored through evaluation of communications, contact information, and/or stored in text suggestion dictionaries.

At 820, a text entry in a text suggestion dictionary is stored. For example text such as a word, phrase, or sentence automatically determined to recur in past communications can be automatically included and stored in a text entry in a text suggestion dictionary. The text can be associated with one or more context attributes by including, in the metadata for the text entry, indications of the one or more context attributes included in the past communications where the text recurred. In some implementations, text can be associated with a counter and stored in a cache of the text suggestion dictionary before it is included in a text entry of a text suggestion dictionary. For example, if the storage allocated for text entries of the text suggestion dictionary is full, text determined to recur in past communications can be stored in a cache along with a count of the number of times the text is used in past communications. When the count for the text in the cache reaches a count that is higher than a count included in one of the text entries in the text suggestion dictionary, the cached text can be included in a text entry which can then replace the text entry with the lower count in the text suggestion dictionary. In some implementations, a text suggestion dictionary can be expanded and allowed to grow when text entries are added to the text suggestion dictionary.

In some implementations, after text has been included in a text suggestion dictionary, the text can be deleted from the text suggestion dictionary. For example, text automatically stored in a text suggestion dictionary that a user does not want to be stored in the text suggestion dictionary can be deleted. In some implementations, the text suggestion dictionary can be cleared such that the text entries personalized for a user by being associated with the user can be deleted from the text suggestion dictionary. The text suggestion dictionary can routinely run maintenance such that it purges and/or otherwise updates text entries that include text (e.g., words or the like) determined to not have been used for a range of time, such as a number of days (e.g., 180 days or other number of days), based upon time attribute information in metadata stored in the text suggestion dictionary.

At 830, input for a current communication associated with a communication context that includes the at least one context attribute is received. For example, a user can be generating a message to be sent to a contact and a communication context can be determined for the communication. For example, one or more context attributes for the communication can be determined based on one or more of the contact, classifications of the contact, a domain for the communication, a time, or the like. In some implementations, the input is text or voice input. The input can be a partial word, phrase, sentence, or other portion of text.

At 840, based on the received input and the communication context, at least one predicted-text suggestion for the current communication is determined using the text entry of the text suggestion dictionary. For example, text of a text entry can be included in a predicted-text suggestion based on an association of the text with one or more context attributes included in the communication context of the current communication. The text of the text entry can be associated with the context attributes of the current communication's context through the metadata that associates the text can with the context attributes.

In some implementations, one or more filters can be applied when determining predicted-text suggestions to be provided for a user's selection based on the communication context of the current communication. For example, a filter can allow predicted-text suggestions that are appropriate for the filter. In an exemplary implementation, predicted-text suggestions that include text that is determined to be associated with one or more context attributes in a way that is allowed by one or more applied filters can be allowed to be provided for selection in a display.

In some implementations, text in text suggestion dictionaries can be associated with one or more context attributes such that a filter can allow appropriate suggestions to be provided. For example, a current communication with a context that includes a work domain can invoke a filter that allows predicted-text suggestions with text that is determined appropriate for a work domain as indicated by an association between the text and a work domain context attribute. In another example, a context attribute that indicates the communication is between an employee user and a supervisor contact can prompt a filter that suggests text in predicted-text suggestions that is determined to be appropriate for a conversation with a supervisor based on an association with the text and a supervisor relationship context attribute. In yet another example, an age appropriateness filter can be applied based on a context of a communication to allow age appropriate text to be provided in predicted-text suggestions.

At 850, the at least one predicted-text suggestion is provided as an option for selection. For example, the at least one predicted-text suggestion can be provided as an option for selection in a display of the device. A user can select the option using a user interface of the device and the selection of the at least on predicted-text suggestion can be received at the device through the user interface. The text of the selected at least one predicted-text suggestion can be included in the current communication in place of, in response to, or to complete the input included in the communication. The predicted-text suggestion offered based upon processing the metadata can be presented with text formatting (e.g., a background color, a bold font, or other formatting) to indicate that the predicted-text suggestion was determined to be a likely recommendation. Text (e.g., a word, words, or the like) can be placed higher up in the ranking and/or in the hierarchical order of possible text for inclusion in predicted-text suggestions based on successful comparisons (e.g., matches, near matches, or the like) with the input of the current communication and the text, and successful comparisons with associations included in the metadata for the text and the communication context for the current communication. For example, the comparison determining that the metadata indicates that the text is associated with one or more context attributes or other information included in the communication context for the current communication.

At 860, based on receiving a selection of the at least one predicted-text suggestion, the text entry of the text suggestion dictionary is updated. In some implementations, in response to the text of the predicted-text suggestion being selected for inclusion in the current communication, the metadata of the text entry that includes the text in the text suggestion dictionary can be updated. For example, count information in the text entry metadata can be updated to increment a count reflecting that the text has been used another time in a communication. In some implementations, the metadata for the text entry can be updated to make associations with one or more context attributes included in the context for the current communication. In another example, preceding text information and/or do-not-follow text information of the metadata for the text entry can be updated.

Figure 9:
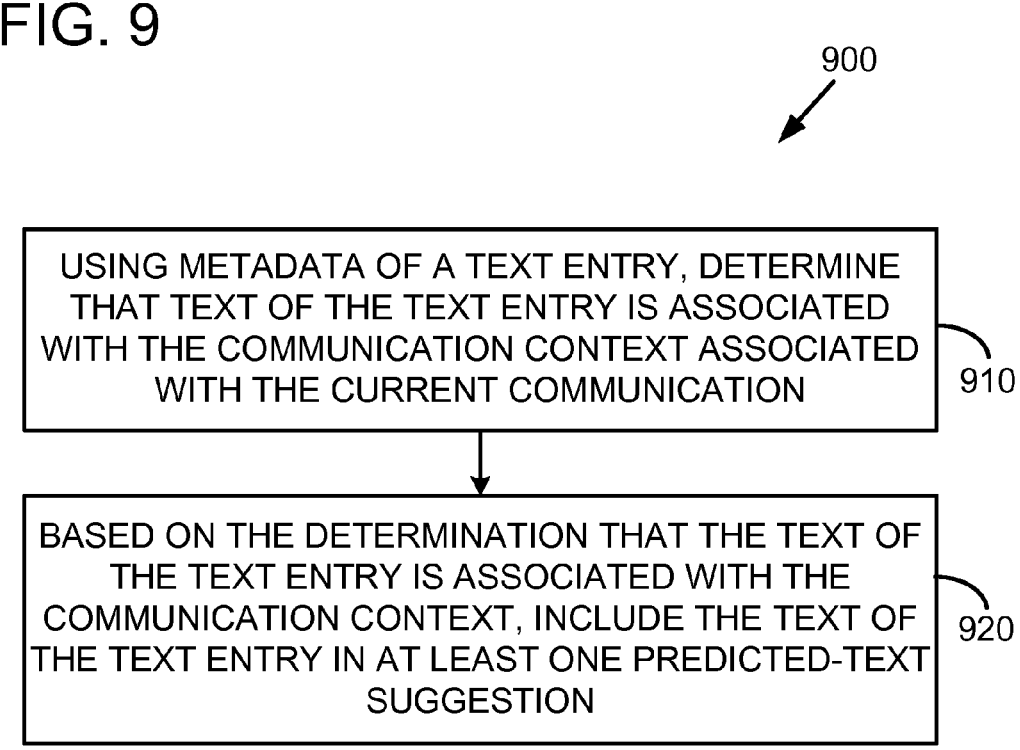
FIG. 9 is a flow diagram illustrating an exemplary method for including text in a predicted-text suggestion based on an association of the text with a communication context.

Exemplary Method for Including Text in a Predicted-Text Suggestion Based on an Association of the Text with a Communication Context FIG. 9 is a flow diagram illustrating an exemplary method 900 for including text of a text entry in at least one predicted-text suggestion based on an association of the text with a communication context. In FIG. 9, using metadata of a text entry, a determination is made that the text of the text entry is associated with the communication context associated with the current communication at 910. For example, the communication context includes one or more context attributes that are associated with the text of the text entry through the metadata of the text entry.

At 920, based on the determination that the text of the text entry is associated with the communication context, the text of the text entry is included in at least one predicted-text suggestion. For example, a predicted-text suggestion is generated that includes the text and provided as on option for selection in a display of the device.

Exemplary Mobile Device

Figure 10:
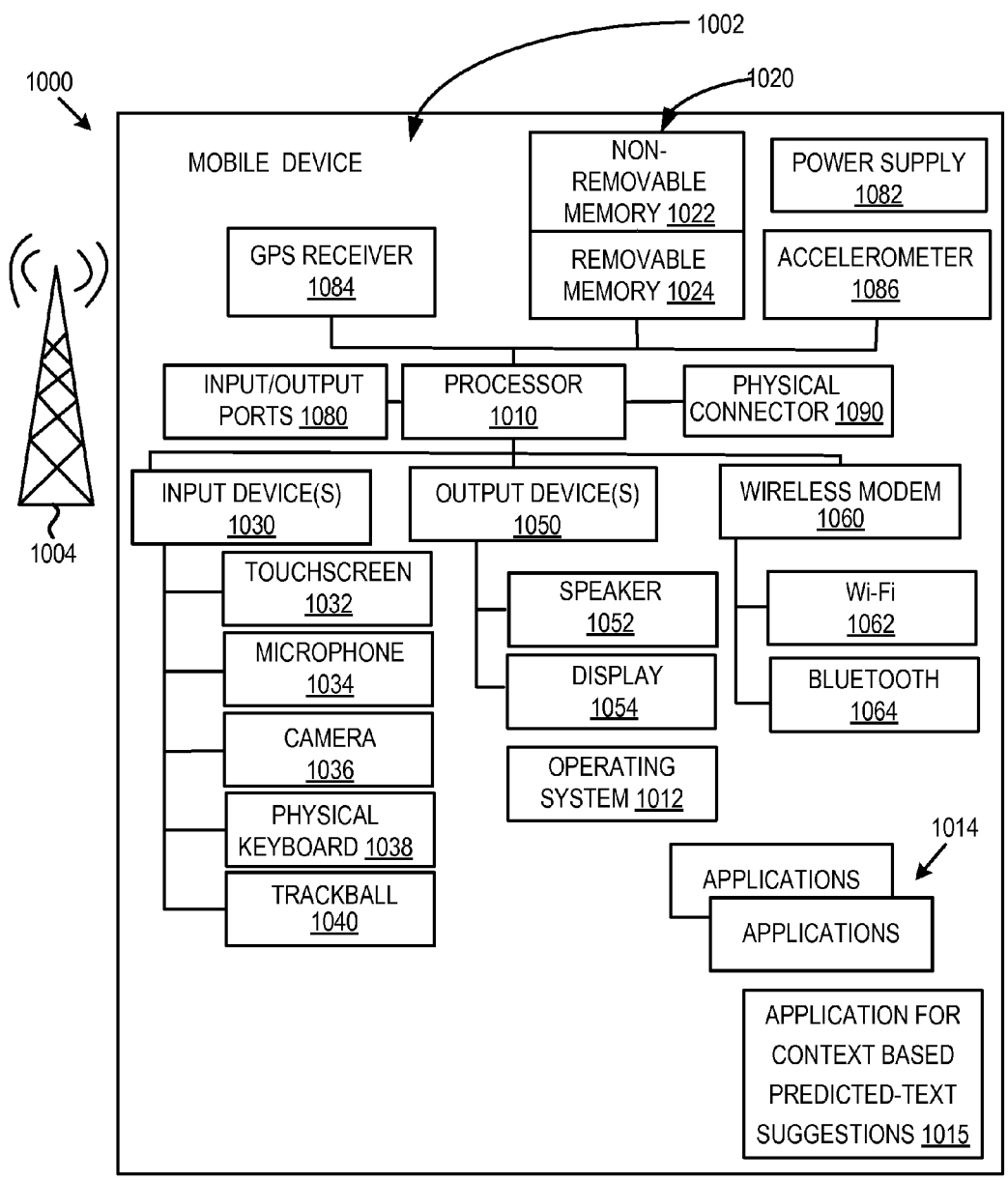
FIG. 10 is a schematic diagram illustrating an exemplary mobile device with which at least some of the disclosed embodiments can be implemented.

FIG. 10 is a system diagram depicting an exemplary mobile device 1000 including a variety of optional hardware and software components, shown generally at 1002. In general, a component 1002 in the mobile device can communicate with any other component, although not all connections are shown, for ease of illustration. The mobile device can be any of a variety of computing devices (e.g., cell phone, smartphone, handheld computer, tablet computer, Personal Digital Assistant (PDA), etc.) and can allow wireless two-way communications with one or more mobile communications networks 1004, such as a cellular or satellite network.

The illustrated mobile device 1000 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components 1002 and support for one or more of the application programs 1014, 1015. The application 1015 can implement one or more of the technologies described herein, such as determining and providing communication context based predicted-text suggestions. The application programs can include common mobile computing applications (e.g., email applications, calendars, contact managers, web browsers, messaging applications), or any other computing application.

The illustrated mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014, 1015. Example data can include web pages, text, images, sound files, video data, or other data sets to be sent to and/or received from one or more network servers or other devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1000 can support one or more input devices 1030, such as a touchscreen 1032, microphone 1034, camera 1036, physical keyboard 1038 and/or trackball 1040 and one or more output devices 1050, such as a speaker 1052 and a display 1054. Other possible output devices (not shown) can include piezoelectric or other haptic output devices. Some devices can serve more than one input/output function. For example, touchscreen 1032 and display 1054 can be combined in a single input/output device. The input devices 1030 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 can comprise speech-recognition software as part of a voice user interface that allows a user to operate the device 1000 via voice commands. Further, the device 1000 can comprise input devices and software that allows for user interaction via a user's spatial gestures, such as detecting and interpreting gestures to provide input to a gaming application or other application.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth 1064 or Wi-Fi 1062). The wireless modem 1060 is typically configured for communication with one or more cellular networks, such as a GSM network for data and voice communications within a single cellular network, between cellular networks, or between the mobile device and a public switched telephone network (PSTN).

The mobile device can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can deleted and other components can be added.

Exemplary Implementation Environment

Figure 11:
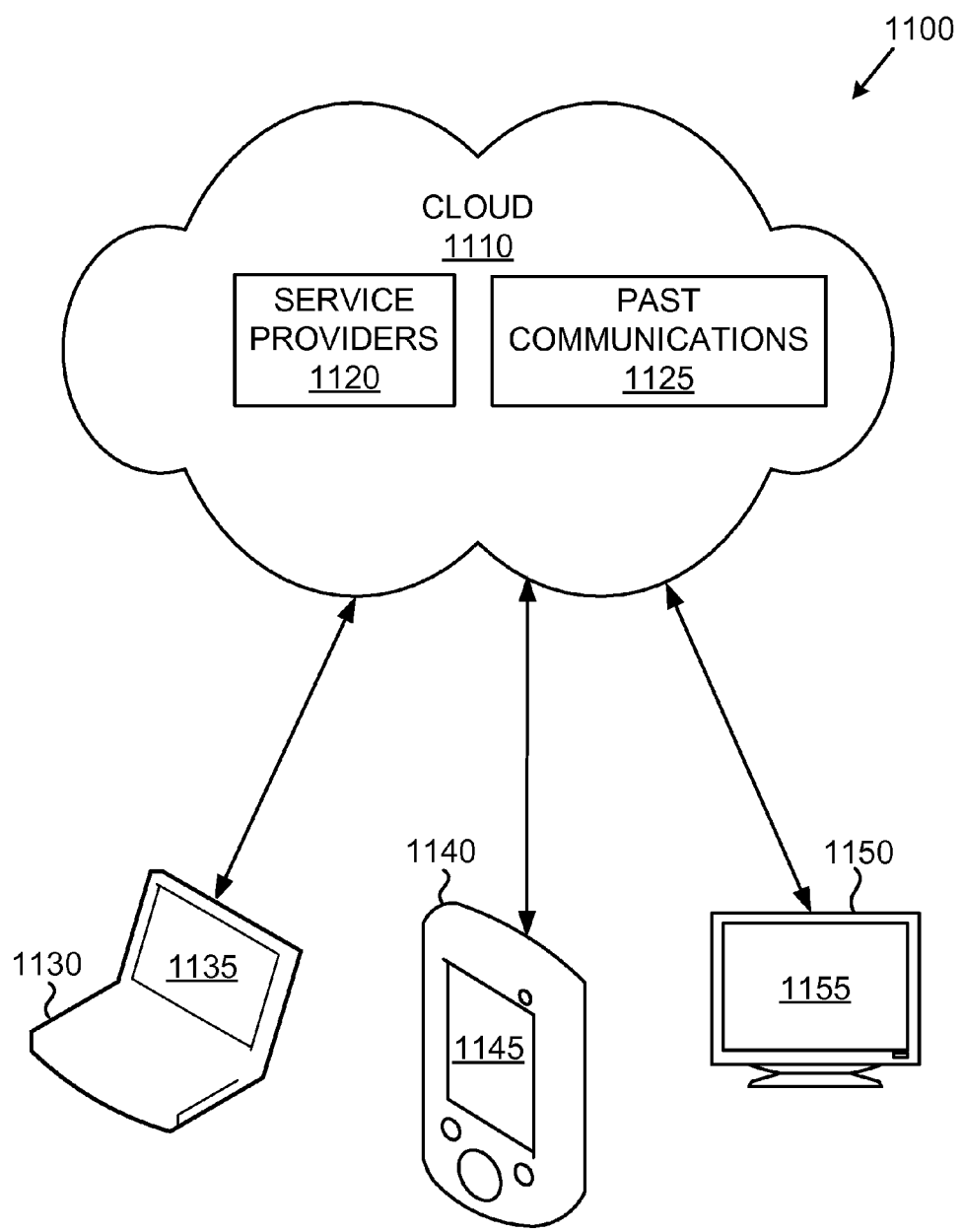
FIG. 11 is a schematic diagram illustrating a generalized example of a suitable implementation environment for at least some of the disclosed embodiments.

FIG. 11 is a diagram that illustrates a generalized example of a suitable implementation environment 1100 in which described embodiments, techniques, and technologies may be implemented.

In example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, or the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, and 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users). The cloud 1110 can store one or more past communications 1125.

Exemplary Computing Environment

Figure 12:
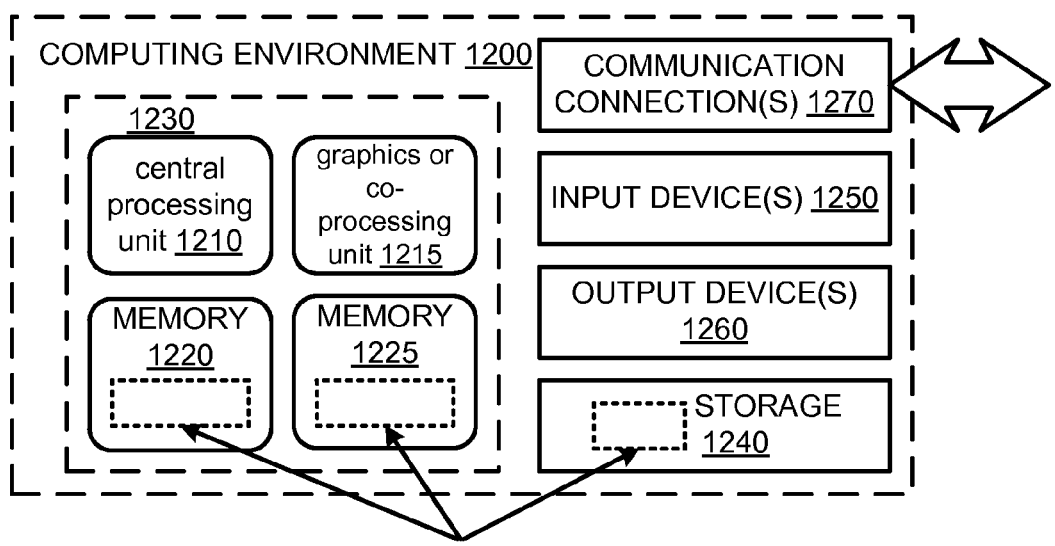
FIG. 12 is schematic diagram illustrating a generalized example of a suitable computing environment for at least some of the disclosed embodiments.

FIG. 12 depicts a generalized example of a suitable computing environment 1200 in which the described innovations may be implemented. The computing environment 1200 is not intended to suggest any limitation as to scope of use or functionality, as the innovations may be implemented in diverse general-purpose or special-purpose computing systems. For example, the computing environment 1200 can be any of a variety of computing devices (e.g., desktop computer, laptop computer, server computer, tablet computer, media player, gaming system, mobile device, etc.)

With reference to FIG. 12, the computing environment 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), nonvolatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The tangible storage 1240 may be removable or non-removable, and includes magnetic disks, magnetic tapes or cassettes, hard disks, solid-state storage such as solid state drives, or optical disks such as CD-ROMs or DVDs. The storage 1240 stores instructions for the software 1280 implementing one or more innovations described herein such as determining and providing communication context based predicted-text suggestions.

The input device(s) 1250 may be a touch input device such as a keyboard, mouse, pen, or trackball, a voice input device, a scanning device, or another device that provides input to the computing environment 1200. For video encoding, the input device(s) 1250 may be a camera, video card, TV tuner card, or similar device that accepts video input in analog or digital form, or a CD-ROM or CD-RW that reads video samples into the computing environment 1200. The output device(s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals and/or signals per se. Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method comprising:
    determining text that recurs in one or more past communications associated with at least one context attribute;
    storing a text entry in a first text suggestion dictionary, the text entry comprising the text and first metadata associating the text with the at least a first context attribute;
    using the first text suggestion dictionary, determining at least one predicted-text suggestion for a current communication associated with a communication context that comprises the at least first context attribute, the at least one predicted-text suggestion including the text; and
    using the first text suggestion dictionary for email messages and further including using a second text suggestion dictionary for text messages;
    storing second metadata in the second text suggestion dictionary, the second metadata associating text with other context attributes than the first context attribute so that separate metadata is stored for different contexts and text in each of the first and second text suggestion dictionaries is associated with the metadata through edges.

2. The method of claim 1 further comprising receiving input for the current communication; and
    wherein the determining the at least one predicted-text suggestion comprises:

based on the input and the communication context, including the text of the text entry in the at least one predicted-text suggestion.

3. The method of claim 2, wherein the input comprises text input; and
wherein the including the text of the text entry in the at least one predicted-text suggestion comprises
determining that one or more characters of the text of the text entry comprises one or more characters of the text input; and
using the first metadata of the text entry, determining that the text of the text entry is associated with the communication context associated with the current communication.

4. The method of claim 1, wherein the one or more past communications are stored on a device.

5. The method of claim 1, wherein the determining the text that recurs in one or more past communications comprises receiving a file for updating the first text suggestion dictionary.

6. The method of claim 1, wherein the at least first context attribute comprises an age attribute, a domain attribute, a relationship attribute, a time attribute, a messaging technology attribute, response attribute, or an association attribute.

7. The method of claim 1 further comprising providing the one or more predicted-text suggestions as an option for selection.

8. The method of claim 1, wherein the text is not text that is banned.

9. The method of claim 1, wherein the text is first text and the method further comprising deleting second text from the first text suggestion dictionary.

10. The method of claim 1 further comprising customizing the communication context.

11. The method of claim 1 further comprising updating the text entry in the first text suggestion dictionary, the updating comprising incrementing a count for the text entry.

12. A mobile device that includes a processor and memory, the memory storing computer-executable instructions that when executed cause the mobile device to perform a method, the method comprising:
receiving input for a current communication associated with a communication context;
determining text that recurs in two or more past communications associated with one or more context attributes;
storing a text entry in a first text suggestion dictionary, the text entry comprising the text;
based on the received input and the communication context, determining one or more predicted-text suggestions for the current communication using the first text suggestion dictionary, wherein the first text suggestion dictionary is used for a first type of communication;
storing text entries in a second text suggestion dictionary, different than the first text suggestion dictionary; and
using the second text suggestion dictionary, instead of the first text suggestion dictionary, for a second type of communication;
storing separate metadata for each of the first and second text suggestion dictionaries for different contexts, wherein the metadata associates text in at least the first text suggestion dictionary with the one or more context attributes.

13. The mobile device of claim 12, wherein at least one of the one or more predicted-text suggestions from the first text suggestion dictionary comprises the text of the text entry of the first text suggestion dictionary.

14. The mobile device of claim 12, further comprising providing the one or more predicted-text suggestions as options for selection;
receiving a selection of the at least one of the one or more predicted-text suggestions; and
in response receiving the selection of the at least one of the one or more predicted-text suggestions updating the metadata of the text entry.

15. The mobile device of claim 12, wherein the determining the text that recurs in the one or more past communications comprises receiving a file that comprises the text and context information for the one or more past communications.

16. The mobile device of claim 12, wherein the input comprises voice input or text input.

17. The mobile device of claim 12, wherein determining one or more predicted-text suggestions comprises:
using metadata of the text entry, determining that the text of the text entry is associated with the communication context associated with the current communication.

18. One or more computer-readable storage media storing computer-executable instructions for causing a computing system to perform a method, the method comprising:
determining text that recurs in one or more past communications associated with at least one context attribute and maintaining a count of how many times the text was used in the one or more past communications;
if the count exceeds a predetermined threshold, storing a text entry in a first text suggestion dictionary, the text entry comprising the text and metadata associating the text with the at least one context attribute;
receiving input for a current communication associated with a first communication context that comprises the at least one context attribute;
based on the received input and the first communication context, determining at least one predicted-text suggestion for the current communication using the text entry of the first text suggestion dictionary, the determining the at least one predicted-text suggestion comprising:
using the metadata of the text entry, including the count, determining that the text of the text entry is associated with the first communication context associated with the current communication; and
based on the determination that the text of the text entry is associated with the first communication context, including the text of the text entry in the at least one predicted-text suggestion;
receiving input for a communication associated with a second communication context;
based on the received input and the second communication context, determining at least one predicted-text suggestion using a second text suggestion dictionary;
wherein words within the first text suggestion dictionary are associated through edges with the metadata indicating associations with context attributes.

* * * * *